(No Model.) 3 Sheets—Sheet 1.
W. HADDOCK.
CABLE STREET RAILWAY.
No. 275,378. Patented Apr. 10, 1883.
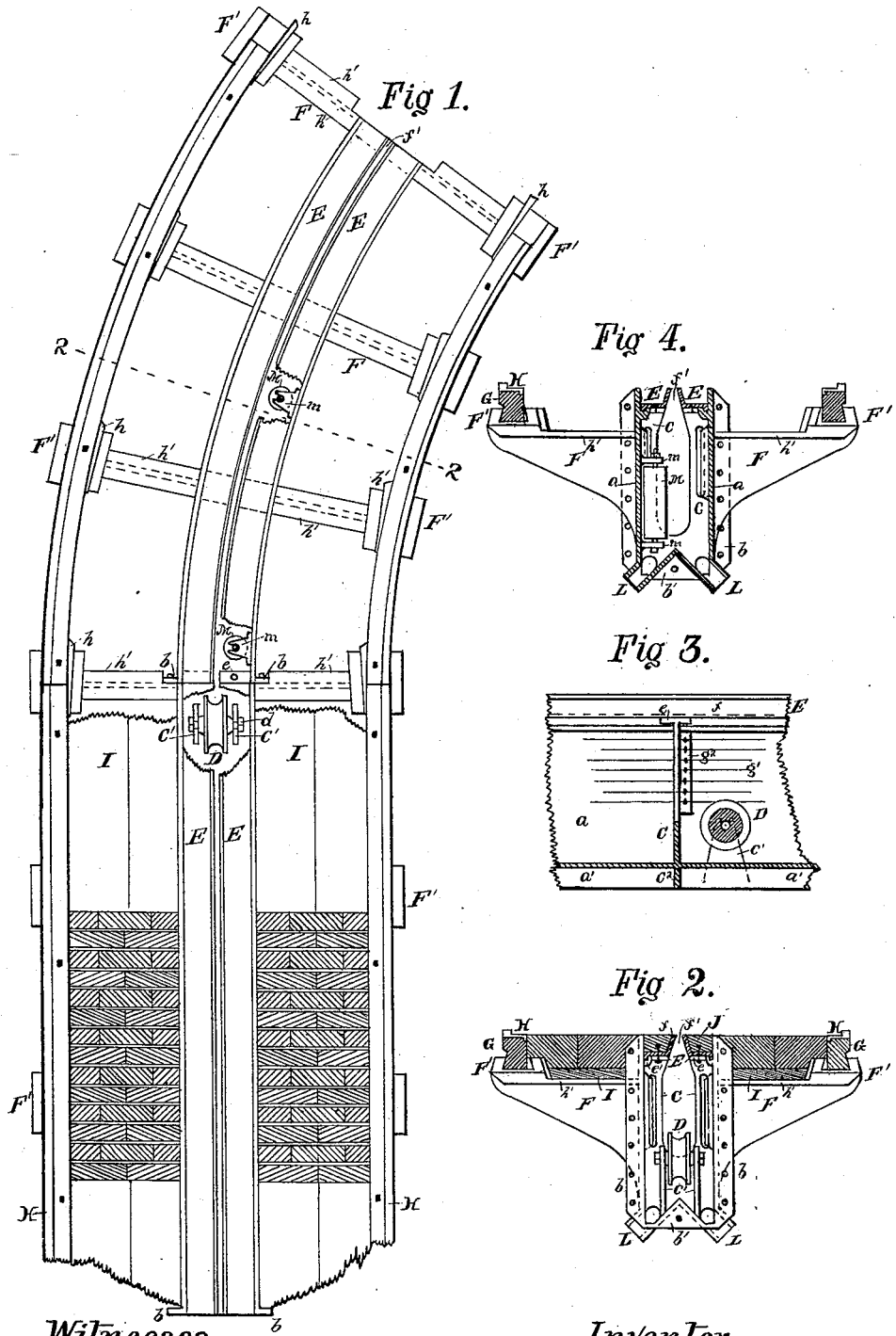

(No Model.) 3 Sheets—Sheet 2.

W. HADDOCK.
CABLE STREET RAILWAY.

No. 275,378. Patented Apr. 10, 1883.

Witnesses: Inventor:

(No Model.) 3 Sheets—Sheet 3.

W. HADDOCK.
CABLE STREET RAILWAY.

No. 275,378. Patented Apr. 10, 1883.

Witnesses: E. R. Hill, Wm. Strehli.

Inventor: Worcester Haddock

UNITED STATES PATENT OFFICE.

WORCESTER HADDOCK, OF CINCINNATI, OHIO, ASSIGNOR TO THE NATIONAL CABLE POWER COMPANY, OF SAME PLACE.

CABLE STREET-RAILWAY.

SPECIFICATION forming part of Letters Patent No. 275,378, dated April 10, 1883.

Application filed November 12, 1881. (No model.)

*To all whom it may concern:*

Be it known that I, WORCESTER HADDOCK, of Cincinnati, Hamilton county, Ohio, have invented certain new and useful Improvements in Cable Street-Railroads, of which the following is a specification.

My invention relates to that class of street-railroads in which an underground cable is employed for propelling the cars.

The nature of my invention, and of its several features, and the advantages resulting from the employment, as desired, of one or more of said features, are fully apparent from the following description.

Figure 5:
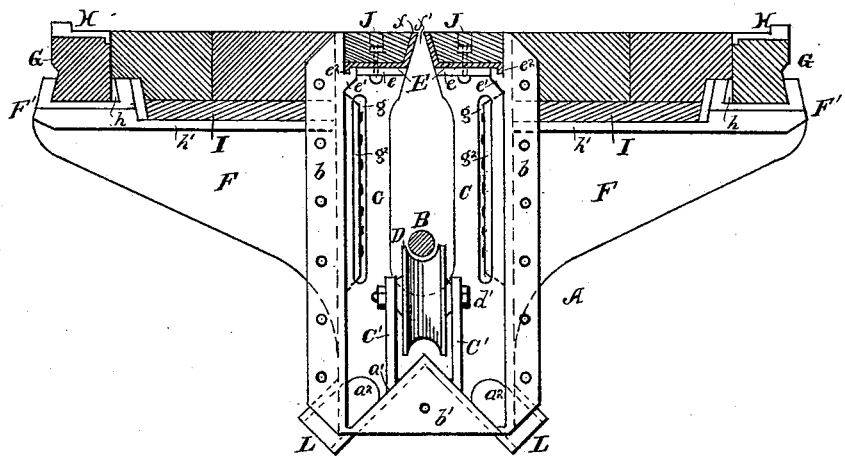
Figure 6:
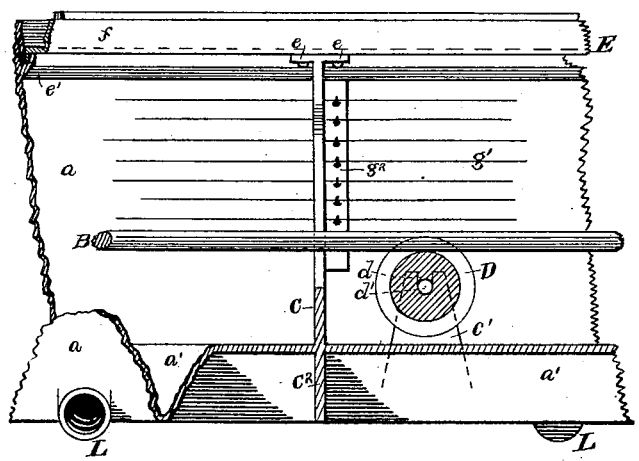
Figure 7:
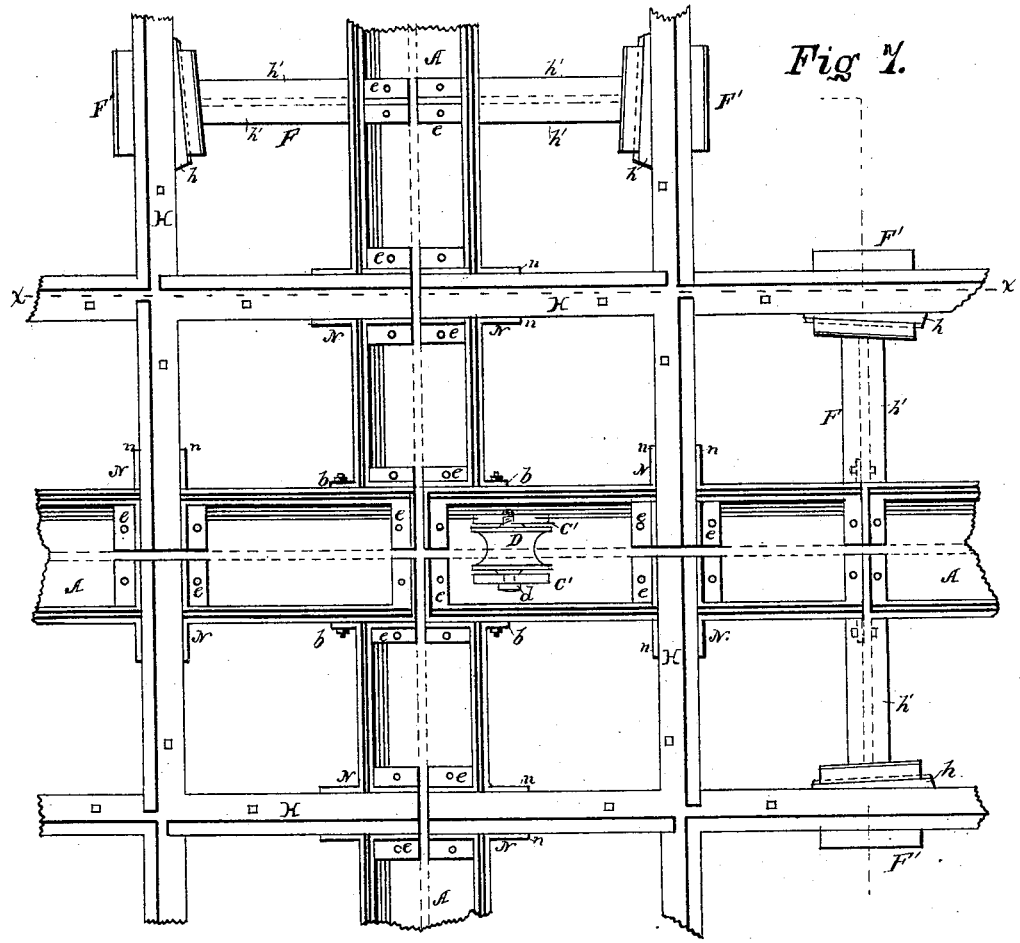
Figure 8:
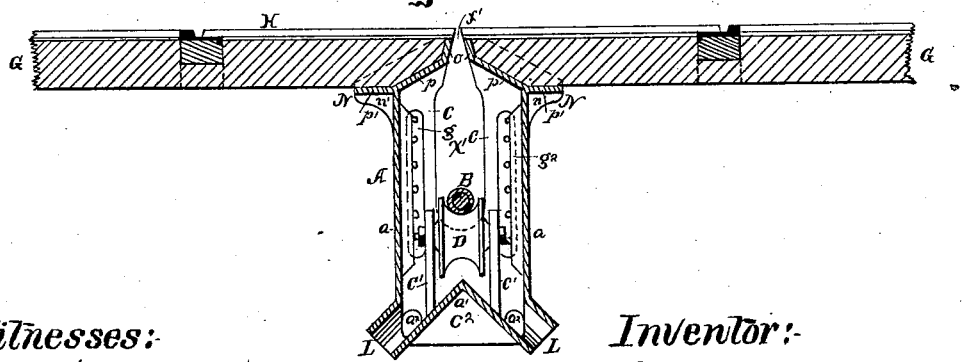

Referring to the drawings, forming part of this specification, Figure 1 is a plan view of a track, representing a curve and illustrating a part of my invention. Fig. 2 is an end view of one of the sections of tube. Fig. 3 is an elevation of one side of the interior of the box or tube. Fig. 4 is a sectional view taken at the line 2 2 of Fig. 1. Fig. 5 is an enlarged view of Fig. 2. Fig. 6 is an enlarged view of Fig. 3, with the addition of the drain-outlets. Fig. 7 is a plan view, representing two tracks crossing at right angles, illustrating certain other features of my invention. Fig. 8 represents a section taken through the line $xx$, Fig. 7, showing the method of connecting the stringer and rails of a cross-track to the box or tube.

A is the box, which consists of the two (2) sides $a$ and the arched or V-shaped bottom $a'$, preferably cast in one piece. This box or tube is made (preferably cast) in sections, usually of about ten feet in length, each end of the various sections being provided with flanges $b$, connected to the sides $a$, and with the flanges $b'$, connected to the bottom $a'$, by means of which the sections are bolted together to form a continuous tube, in which the cable B travels. At intervals of from three to five feet the interior of the box is provided with the inwardly-projecting ribs C, and below the bottom $a'$, in the concave formed by its arched shape, is a rib, $C^2$, the purpose of these ribs being to give strength to the box or tube. The rib C, when preferred, may be made shorter, and in bracket form. Brackets C', for the support of the grooved pulleys D, are cast on the bottom of the box, the space between the various brackets varying accordingly as the grade of the street may require, the pulleys requiring to be closer together when the street is rolling than when the street is level. These brackets are preferably made of the form shown in Fig. 6, a deep notch, $d$, being formed in the top of each bracket, so that the bolt $d'$, upon which the pulley D turns, can be put into position in said notches after the bolt has been inserted through the pulley. This bolt $d'$ is provided at one end with a head, so that when the bolt, with the pulleys upon it, has been placed in position, and a nut screwed onto the other end of the bolt until the bracket is tightly clamped between the bolt-head and the nut, the bolt is held firmly in the bracket, the pulley D being free to turn on said bolt. By this construction it is an easy matter to insert or remove any one of the pulleys, and the bolts $d'$ not turning in the bracket, there is no wear of the bracket by the constant revolution of the pulleys upon which the cable runs, the wear being either on the pulley or the bolt upon which it turns, either or both of which can be easily replaced. The upper ends of the ribs C are provided with the flanges $e$, and the sides $a$ are provided, at the same level of the flanges $e$, with a continuous ridge, $e'$, and upon this ridge $e'$ and the flanges $e$ on the ribs C rest the top plates, E, which are secured by bolts passing through the flanges $e$. The outer edges of the plates E are each provided with downwardly-projecting flanges $e^2$, which fit into corresponding grooves or channels in the upper side of the ridge $e'$, which construction serves to hold the plates more securely in position.

Instead of the continuous ridge $e'$, it will be obvious that a series of lugs may be employed to accomplish the same object as the continuous ridge; but this construction is not so desirable as the continuous ridge. The central edges of each of the plates E are provided with an upturned flange, $f$, and when these plates are in position they form the cover to the box, leaving only a narrow opening, $f'$, which extends the entire length of the box. This opening $f'$ in the present instance is directly over the center of the box, its sides being formed by the flanges $f$, and is about seven-eighths ($\frac{7}{8}$) of an inch in width at the surface of the ground; but the flanges $f$ extending obliquely downward from the surface, the opening widens toward the interior of the box, the narrowest portion being at the surface of the ground, as shown in the drawings. In this opening $f'$ travels the shank of the clutch or other device which grasps the cable, the upper end of said shank being suitably connected to the car. The opening may be to one side of the longitudinal center where the construction of the clutch or gripper renders the same desirable.

The ribs C are provided near their junction with the sides of the box with openings $g$, through which are passed the telegraph or telephone wires $g'$ for the use of the company owning or operating the road, these wires being attached to wooden strips $g^2$, which are secured to the sides of the box.

At either side of the box A are the brackets F, which are either cast with or bolted to the box, the preferable method being to cast them in one piece with the box. Any desired means of attaching the stringers to the brackets may be employed; but I prefer to employ the following novel, useful, and convenient means: These brackets extend out on either side to form a support for the stringers, upon which the rails are placed, the ends of each bracket being provided with a shoe, F', formed with a bottom and two dovetailed flanges, in which rests the stringers G, on which rails H are laid, and these stringers are retained in the shoes F' by a dovetailed wedge, $h$, which is driven between the side of the stringer and one of the flanges of the shoe. These brackets F being secured to the box A, and the stringers G being secured in the shoes F', the track and the box are always in the same position with relation to each other. The main upright portion of the bracket F is quite thin, and its upper edge, between the shoe F' and the box, is provided with a flange, $h'$, upon which the planks I may be laid and secured, these planks forming the foundation for wooden or other pavement, which is laid between the rails. In the drawings is shown that description of pavement which is known as "Nicholson pavement;" but any description of pavement may be laid on these planks. When desired, the planks may be omitted, and any kind of pavement, except those which require a plank foundation, may be laid directly upon the ground.

Above the plates E, between the upright flanges $f$ and the upper edges of the sides of the box, are laid the planks J, which are secured by bolts passing through the flanges $e$, or through the plate E on the upper ends of the ribs C. The bottom $a'$ being higher along the center than at either side, any water or dirt which falls into the box through the opening $f'$ is conducted away from the pulleys D and the cable, and is carried out through the drain-outlets L, which are connected with the sewer or other drain pipe. The lower ends of the ribs C are cut away at the angle between the sides $a$ and the bottom $a'$, leaving an opening, $a^2$, through which any water or dirt may pass through to the drain-outlets. Any water, of course, will run out of its own accord; but in dry weather, any dust or dirt which may accumulate in the box may be easily washed out by letting water into the box from the hydrant or other source. In cold climates, ice and snow may fall through the opening $f'$ and collect in the bottom of the box; but from the shape of the bottom it falls toward the drain-outlets, and by scattering salt in the box the ice or snow is melted, and runs out through the drain-outlets. The shape of the opening $f'$, being narrowest at the surface of the ground, prevents any dirt or small stones from becoming lodged in the opening, as anything which will enter the opening from above will fall through to the bottom of the box and be carried out through the drain-outlets L. When the track makes a curve, as shown in Fig. 1, it is necessary, to prevent the cable from coming in contact with the sides of the box, to place a number of vertical rollers, M, on the side of the box toward which the track curves. The number of these rollers will, of course, vary according to the extent of the curvature of the track, the rollers being secured in brackets $m$, which are preferably similar in construction to the brackets C', before described. Each box or tube A to be used for a curved track is cast like the box for a straight track, except that it is given the proper degree of curvature, one of the sides $a$ being provided with brackets $m$ for reception of the vertical rollers M.

Figs. 7 and 8 represent the construction and arrangement as applied to a track-crossing, the plates E, forming the top or cover of the boxes, being removed. In this instance the track, running across the drawing from side to side, is represented as being the main track. Where the box A of the crossing track meets the box of the main track the sides $a$ of the main box are cut away to leave an opening similar in shape to the space $x'$ between the ribs C on the interior of the box, and to either side of the main box is bolted one of the sections of the cross-box by passing bolts through the flanges $b$ on the end of said sections and through the sides $a$ of the main box. By this means there is formed a continuous box in either direction, and a cable may be run in both the main and cross boxes at the same time. It is desirable, however, to place the grooved pulleys D which are nearest the crossing of the boxes in such a position that one cable will be held slightly above the other, so that they will not rub one against the other when they are in motion. At the points where the rails cross the boxes the sides of the latter are each provided with a shoe, N, in which is placed the end of the stringer, as shown in Fig. 8. The central ends or bearings, *p*, of the shoes N, on opposite sides of the boxes, do not quite meet, but leave a space equal to the width of the opening *f'*, before described, so that this opening may remain continuous throughout the entire length of the track, not being in any way interfered with by cross-tracks. The outer ends or bearings, *p'*, of the shoes N extend slightly beyond the sides of the box, and these projecting ends are supported by brackets *n'*. This shoe N is provided with side flanges, *n*, which extend up on the sides of the stringer, and an end flange, *o*, against which the end of the stringer rests. These end flanges *o* stand at the same angle with reference to the rail as the flanges *f* of the plate E, so that the shape of the opening *f'* is maintained throughout.

While it is desirable to form the shoe N as above described, it may, if preferred, be formed without the outer end, *p'*, leaving only the inner end, *p*; or the inner end, *p*, may be dispensed with, the stringer resting on the outer portion, *p'*, the ends of the stringers extending partly over the top of the box; but this construction is not so desirable as that shown in the drawings. Where one rail crosses another the stringers upon which the rails are laid are preferably halved together in the usual manner, as shown in Fig. 8.

Fig. 7 of the drawings represents one single track crossing another at right angles; but the crossing may be made at any other angle, as may be required by the direction of the streets. So, also, a double track—that is, two tracks running in each direction—may be crossed without in any way interfering with the operation of either, which result has never, to my knowledge, been accomplished by any of the cable-railways now in use.

The shape of the bottom *a'* of the box may, if desired, be somewhat varied without materially affecting the utility of my invention. For instance, instead of the double incline, as shown, there may be but a single incline, the bottom being straight and slanting continuously from one side of the box to the other, in which event the drain-outlets L will only need to be placed on one side of the box—viz., at the lowest inclination of the bottom.

By the above-described construction many advantages are gained over the cable-railways now in use, among which advantages may be mentioned the following: The box in which the cable travels, and the supports for the stringers being entirely of metal, there is no decay of material, and therefore cable-railways constructed according to my invention are more durable, and consequently more economical, than the cable-railways heretofore constructed. The box, being cast or otherwise made in sections, does not require a large amount of excavation to place it in position, as is the case with the cable-rods now in use. This is a very important feature in the construction of this class of railways, as by my construction I am enabled to change an ordinary street-railway into a cable-railway without interfering with the travel to any considerable extent, as the only excavating necessary is between the tracks and just sufficient to contain one section of the box, which may be put in position and bolted to the sections already in position. This, however, is not the case with cable-roads as heretofore made, as the street must be torn up or blockaded on either side of the track in order to place the box or tube in position, and this entirely stops all the travel until the road is complete.

It often becomes necessary to examine the interior of the box at various points; and where my invention is used any part of the interior of the box may be examined without interfering with the street, all that is required being to remove one of the plates E.

My invention is applicable to various railways other than those before mentioned; as, for example, it may be applied to inclined planes and elevated roads. In the latter instance the box may easily be supported by the trestle-work, and will be as thoroughly operative as though it were in the ground.

By the employment of my invention I am enabled to construct any number of cross-tracks, and the cable in one track will not interfere with the cable in the cross-track. This result has not been heretofore accomplished, and is a feature of great importance, as at the present day, in cities of any considerable size, the street-car tracks run in many directions, and in their course cross many other tracks, often at right angles and often at an acute angle.

The mode in which I construct the several parts at and near the point where the opening *f'* of one track crosses the opening *f'* of another track enables me to make a firm, strong track clear up to the said opening *f'*, said track being fully supported by convenient bearings. The aforesaid construction admits of the said portions being readily put together in the first instance, and readily removed and replaced and renewed in case of repair.

The shoes or pieces N may be cast solid with the box, or be made separate and bolted on. The various other parts attached to the sections of the box or tube may be separate and bolted fast; but I prefer, for obvious reasons, to cast or form all in one piece with their respective section of the tube.

What I claim as new and of my invention, and desire to secure by Letters Patent, is—

1. The box or tube A, provided with rib or bracket C and opening *f'*, substantially as and for the purposes specified.

2. The box or tube A, provided with rib or bracket C and supporting flange or lug *e'* and top plate, E, substantially as and for the purposes specified.

3. The box or tube A, provided with rib or bracket C, flange *e*, and top plate, E, substantially as and for the purposes specified.

4. The box or tube A, provided with rib or bracket C, supporting flange or lug $e'$, flange $e$, and top-plate E, substantially as and for the purposes specified.

5. In combination, with the track H and an underground cable, the plate E, provided with the downwardly-projecting flanges $e^2$ and the upwardly-projecting oblique flanges $f$, forming openings $f'$ for the reception of the clutch or gripper, substantially as and for the purposes specified.

6. The tube or box A, provided with the flanges or brackets $e'$ and the flanges $b$, substantially as and for the purposes specified.

7. The tube or box A, provided with the rib or bracket C and flange $b$, substantially as and for the purposes specified.

8. The tube or box A, provided with rib or bracket C and flange or bracket $b$ and flange $b'$, substantially as and for the purposes specified.

9. The combination, at cross-tracks, of the crossing tube or box A and the flange $b$ and rib or bracket C, fixed on said box or tube, the box or tube having its sides cut away, substantially as and for the purposes specified.

10. The tube or box A, provided with an upwardly-projecting convex or arched bottom, $a'$, substantially as and for the purposes specified.

11. The tube or box A, provided with the upwardly-projecting or arched bottom $a'$ and drain-outlets L, substantially as and for the purposes specified.

12. The tube or box A, provided with the upwardly-projecting or arched bottom and passage-openings $a^2$, substantially as and for the purposes specified.

13. The tube or box A, provided with the upwardly-projecting or arched bottom and passage-openings $a^2$ and drain-outlets, substantially as and for the purposes specified.

14. The combination of the tube or box A and the rib or bracket C and the brackets C' and roller D, cable B, substantially as and for the purposes specified.

15. The combination of the tube or box A and the rib or bracket C and bottom $a'$, and roller D, suitably supported, and cable B, substantially as and for the purposes specified.

16. The combination of the tube or box A and brackets F, formed in one piece with the box, for supporting and tying the rails, substantially as and for the purposes specified.

17. The combination of the box or tube A, provided with interior rib or bracket, C, and the brackets F, substantially as and for the purposes specified.

18. The combination of the box or tube A and the brackets F, the ends of said brackets being provided with shoes F', and the upper edges of said brackets, between the shoes and the box, being provided with the flanges $h'$, projecting from both sides of the brackets, all formed in one piece with said brackets, substantially as and for the purposes specified.

19. The brackets F, suitably secured to the box A and provided with the dovetailed shoe F', in combination with the stringers G, held in said shoes by a dovetailed wedge, $h$, substantially as and for the purposes specified.

20. The combination of the brackets F, provided with shoes F', and the stringers G, held in said shoes by the wedge $h$, substantially as and for the purposes specified.

21. In a cable-railway, the combination of the box or tube A and the telegraph or telephone wires $g'$, running in the interior of said tube, substantially as and for the purposes specified.

22. The box or tube A, provided with the interior ribs, C, in combination with the telegraph or telephone wires $g'$, said wires passing through the openings $g$ in said ribs, substantially as and for the purposes specified.

23. The cable box or tube A, provided with the interior ribs, C, in combination with the telegraph or telephone wires $g'$, said wires being connected to the wooden strips $g^2$ and passing through openings $g$ in said ribs, substantially as and for the purposes specified.

24. The combination of the main box or tube A and a cross box or tube, the ends of the latter being bolted to the former by bolts passing through flanges $b$ of the cross box or tube and the sides of the main box or tube, substantially as and for the purposes specified.

25. The combination of a cable tube or box, bearing $p$, and rail H, and the rail-bearing G, substantially as and for the purposes specified.

26. The combination of a cable tube or box and the bearing $p'$, and rail H, and bearing G for rail, substantially as and for the purposes specified.

27. The combination of a cable tube or box and the bearing $p$, and bearing $p'$, and rail H, and bearing, as G, for rail, substantially as and for the purposes specified.

28. The combination of a cable or tube, the bearing $p$, and bearing $p'$, and rail placed at an angle to the length of the box or tube, substantially as and for the purposes specified.

29. The combination of a cable tube or box and the bearings $p$, and ends $o$, forming openings $f'$, substantially as and for the purposes specified.

30. The combination of a cable box or tube, and the bearings $p$ and flanges $n$, substantially as and for the purposes specified.

31. The combination of a cable box or tube and bearings $n'$, and flanges $n$, substantially as and for the purposes specified.

32. The combination of a cable box or tube, the bearings $n'$, and ends $o$, substantially as and for the purposes specified.

33. In combination with a cable box or tube, the shoe N, substantially as and for the purposes specified.

34. The combination of a cable box or tube and shoes N and ends $o$, forming openings $f'$, substantially as and for the purposes specified.

35. In a cable box or tube, the upwardly arched or inclined bottom, in combination with the pulleys D, located over the highest point of said arch, substantially as and for the purposes specified.

36. A traction rope railway tube made in sections, each section being provided with arms formed in one therewith and adapted to support a tie on sills or stringers of the track.

37. The combination of the box or tube A and the brackets F, the ends of said brackets being provided with shoes F', all formed in one piece with said brackets, substantially as and for the purposes specified.

WORCESTER HADDOCK.

Attest:
JOHN J. MOLLOY,
E. R. HILL.